Patented Feb. 6, 1940

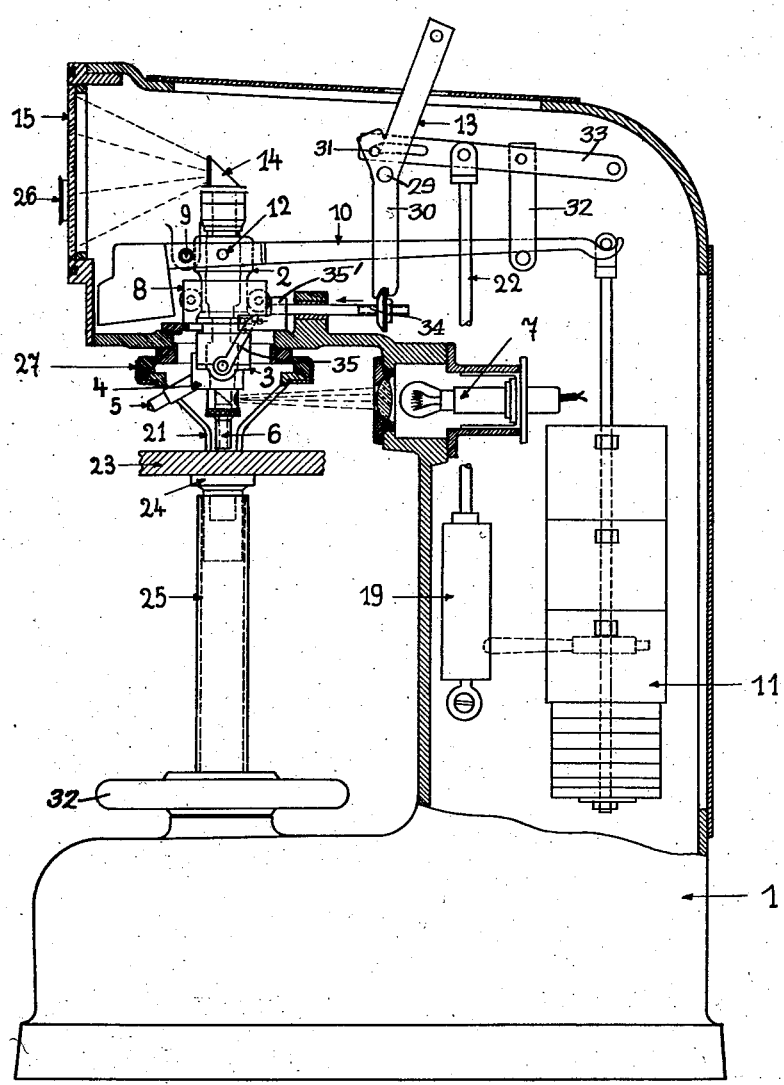

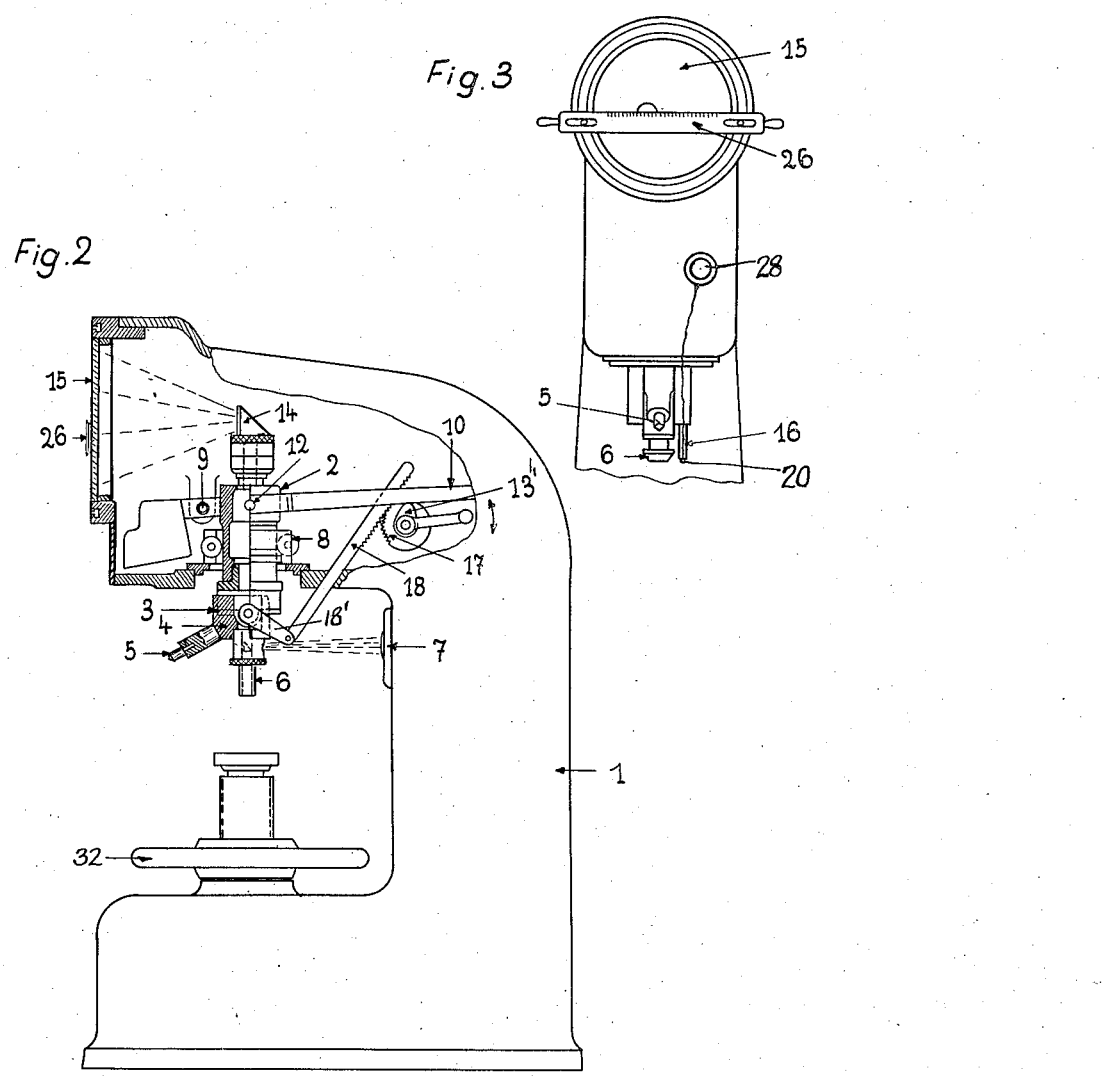

2,188,992

UNITED STATES PATENT OFFICE 2,188,992

HARDNESS TESTER

Otto Wolpert, Mannheim, Germany, and Robert Ludwig, Kladno, Czechoslovakia, assignors to Hessenmuller & Wolpert, Ludwigshafen-on-the-Rhine, Germany, a firm of Germany Application February 1, 1937, Serial No. 123,516 In Germany February 5, 1936

7 Claims. (Cl. 265—12)

This invention relates to a hardness tester.

Hardness is usually tested by applying the methods of Brinell, Rockwell or Vickers, the common feature of which is to press a penetrator under certain conditions of load into the specimen to be tested. Brinell and Vickers obtain the hardness number by dividing the load in kg. by the surface of the indentation expressed in mm.$^2$, whilst Rockwell's hardness number is based on the difference between the depths of penetration at a minor and major load. Accurate measuring of this difference, however, is quite difficult, since elastic deformations, bearing errors, distortions in the specimen to be tested, etc. influence the measurement beyond the permissible limit, particularly if thin or case-hardened materials are to be tested. For example, at a load of 10 kg. five Rockwell units lie in an interval of $1/1000$ mm., so that an accurate determination of individual Rockwell values is not possible any more. Tests with Brinell and Vickers apparatus by means of which the hardness number is ascertained according to the size of the impression are therefore more reliable and accurate, owing to the absence of errors due to the testing machine and the measurement. On the other hand, these hardness testers are open to the objection that measuring is quite bothersome and requires much time. For example, after production of the indentation the specimen must be evaluated with the aid of a special microscope, whereupon the hardness number corresponding to the diameter ascertained has to be found by means of a table. This is troublesome in case of a simple ball impression of 3 to 4 mm., but the difficulty increases considerably if a Vickers impression up to $1/100$ mm. diagonal diameter is concerned.

The mere finding of this impression not visible to the naked eye requires so much time that this testing method cannot be considered economical.

The invention permits full utilization of the advantages afforded by measuring the area of impression without the drawbacks hitherto connected with this testing method, and provides an apparatus that meets all requirements as to accuracy and economy.

By way of example, two embodiments of the invention are illustrated in the accompanying drawings, in which Figure 1 is a side view of a hardness tester; Fig. 2, a view of a modification thereof; and Fig. 3, a front view of the upper part of the device.

Referring to the drawings, the device comprises a stand 1 in the upper part of which the actual testing outfit is inserted consisting of a loading and a measuring appliance. The main part is a tube 2, which at its lower end carries a closure member 3, wherein a swinging member 4 rotatable about a horizontal axis is inserted Into the swinging member 4 a penetrator 5 and a microscope including a lens 6 are screwed so as to be angularly positioned relative to one another. A single lens may be used or a plurality of lenses which, coupled with the tube, forms in effect a microscope.

The stand 1 contains the illuminating device 7. The tube 2 is vertically guided in a sleeve 8. At 9 a single-arm lever 10 is pivoted which at its free end carries the loading weights 11, and leverage is transmitted to the tube 2 by the double bearing 12. The loading lever 10 is released by an operating means to be described. The operating means for the loading lever, as illustrated in Figure 1, comprises a lever 30 pivotally supported at 29 and engaging at its lower end with a nut adjustable lengthwise a rod 34 which at its inner end connects with a slide 35' having pins between which the free end of an arm 35 is interposed with such arm connected to the swinging member 4. Obviously, as the lever 30 is swung in one direction, the arm 35 is swung to position either the microscope 6 or penetrator 5 in operative position. The reverse movement of the rod 34 correspondingly moves the arm 35 and swings the member 4 in the opposite direction to position the remaining functioning member 5 or 6 in proper relation. A portion of the lever 30 is offset and provided with a pin 31 engaging a slot in a lever 33 pivoted at the end remote from the slot to the stand 1. The slot in the lever 33 is formed so that in movement of the lever 30 in one direction the free end of the lever 33 is depressed and in opposite movement of the lever 30, the lever 33 is raised. The lever 33 is connected by a link 32 to the lever 10, the link being free of the lever 10 but having a pin to underlie the lever to limit its movement. The lever 33 is connected to a cylinder 19 containing air under pressure which cushions the movement of the lever 33 in one direction and assists its movement in the opposite direction. The free end of the lever 10 carries weights 11 which, as shown, are arranged for adjustment to create the desired pressure on the parts. The above construction is shown more particularly in Figure 1.

In Figure 2 the lever 10 is operated by a cam 13' designed for manual manipulation and mounted on a disk 17, the peripheral edge of which is formed with teeth to engage the teeth in a lever 18 which, by a terminal link 18', transmits the desired movement to the element 4 for shifting the microscope or penetrator into operative position in correspondence with the operative or inoperative positions of the cam 13'. This construction is shown more particularly in Figure 2.

At its upper end the tube 2 supports a lens with a reflecting prism 14 which throws the image to be projected onto the ground glass screen 15, the projection device comprising the lens 6 of the microscope, the lens with reflecting prism 14, the ground glass screen 15 and the illuminating unit 7. Furthermore, as shown in Fig. 3, laterally of the penetrator 5 a displaceable spacer or stop 16 is disposed which insures the maintenance of unvarying distance between the specimen and the lens and thus the same rate of magnification. The stop 16 may be provided at its point with an electric contact 20 which, when struck by the specimen, closes a circuit and actuates a signal device such as a lamp 28.

As indicated in Fig. 1, the stop 16 can be replaced by a stationary sleeve 21 which surrounds the swinging member 4. According to Fig. 2, the operating means to be described for releasing the loading lever 10 may be advantageously connected with means for positively and simultaneously with the loading or relieving of the tube or thrust bolt 2 bringing the swinging member 4 into the position required. For this purpose, a toothed segment 17 is provided which is connected with the eccentric 13' and engages a rack 18 by means of which it acts upon the member 4 and moves it. The table 24 for the specimen can be adjusted in vertical direction.

The hardness tester described functions as follows:

The specimen 23 to be tested is placed on the table 24. In this position, the image of the surface of the specimen appears completely under the desired enlargement on the ground glass screen. The lens 6 is swung out and the penetrator swung in; the loading lever 10 is permitted to move downwardly by operation of the eccentric and then reversed. The penetrator is then swung out after having been loaded and the lens passes over the indentation of the specimen being tested. The image of the indentation is then thrown by the lens or microscope on the screen where it can be measured by means of the scale 26. The penetrator and the lens being connected in angular relation, a movement of one brings about a movement of the other. The optical outfit is automatically started, so that instantly the indentation appears at the adjusted enlargement on the screen 15 and can be evaluated by means of a correspondingly divided scale 26, though rotary involute curves or other known measuring instruments may be used also. The penetrator will not be swung out at the same time that it is being pressed into the specimen. On the contrary, the movement of the swinging member precedes the loading; that is to say, the member will be first swung out and then it will be loaded and reversed. The penetrator will be swung out after being loaded, the lens passes over the indentation of the specimen to be tested, according to the swinging-out movement. The image of the indentation is thrown by the lens, that is, by the microscope, on the screen, where it can be measured by means of the scale 26. The penetrator and the lens being disposed angularly relative to each other, a movement of one part brings out a similar movement of the other part.

The image of the indentation is sharply defined on the screen 15 at once, since the distance of the optical outfit, once adjusted, remains always the same. Slight variations of the optical distances due to lifting the penetrator can be eliminated by means of the fine adjustment 27. The adjusting ring 27 has screw-threaded connection with the stand 1. It can be turned to move in the direction of its axis and vary the distance between the sleeve 21 and the specimen.

We claim:

1. Material testing machine, comprising a stand, a table for the specimen to be tested, a hollow tubular thrust bolt, a movable penetrator at the end of said bolt, a microscope disposed at the said end of the bolt and adapted to serve for observing the indentation in the specimen, means for loading said thrust bolt, and means for movably supporting the penetrator and microscope as a unit, said means permitting either the penetrator or microscope to be disposed in line with the hollow bolt.

2. Material testing machine, comprising a stand, a vertically adjustable table for the specimen to be tested, a hollow thrust bolt, a swinging member at the lower end of said thrust bolt for supporting a penetrator and a lens angularly disposed relative to one another, means for moving the member to dispose either the lens or penetrator in operative position, additional lenses in said hollow bolt adapted to enlarge the image of the indentation and a lever for loading said thrust bolt by means of a force acting on the end of the lever.

3. Material testing machine according to claim 1, wherein an adjustable stop for fixing the distance between the surface of the specimen and the lens of the microscope is provided to insure continual sharp focussing of the image of the indentation on the screen.

4. Material testing machine according to claim 1, comprising a stop for fixing the distance between the specimen and the lens and a contact point at the lower end of the stop connected in a circuit operating an indicator.

5. Material testing machine, comprising a stand, an adjustable table for the specimen to be tested, a hollow thrust bolt, an indenting tool carried thereby, a microscope at the lower end of the bolt adjustable to be selectively arranged in or out of alignment with the hollow thrust bolt, a lens at the upper end of the bolt, a reflecting prism cooperating with the lens at the upper end of the bolt, a ground glass screen in the stand and a source of light connected with the stand, the rays of which illuminate the microscope and the indentation in the specimen, and are deflected by the prism.

6. Material testing machine according to claim 2, wherein means for the simultaneous removal of the load from the specimen and the motion of the microscope are provided.

7. Material testing machine according to claim 2, comprising an eccentric in the stand for lifting off the loading lever of the thrust bolt, a toothed segment connected with the eccentric and a rack engaged by said toothed segment, said rack cooperating with and operating the member holding the microscope and the penetrator.

ROBERT LUDWIG.
OTTO WOLPERT.